United States Patent [11] 3,628,933

[72] Inventor Walter E. Kramer
Niles, Ill.
[21] Appl. No. 40,982
[22] Filed May 27, 1970
[45] Patented Dec. 21, 1971
[73] Assignee Zenith Radio Corporation
Chicago, Ill.

[54] METHOD OF ACTIVATING LEAD GLASS MICROCHANNEL PLATES
7 Claims, 2 Drawing Figs.

[52] U.S. Cl. .................................................. 65/30,
117/118, 117/124 B, 117/124 C, 117/201,
117/211, 117/227, 117/229, 117/DIG. 2
[51] Int. Cl. ........................................... C03c 23/00,
H01b 7/20, C03c 17/06
[50] Field of Search .......................................... 117/8, 63,
201, 211, 227, 229, 120, 97, 118, 124 B, 124 C;
134/2; 65/30, 31

[56] References Cited
UNITED STATES PATENTS
2,892,738  6/1959  Dobratz ........................ 134/2
3,118,788  1/1964  Hensler ........................ 117/118
3,275,428  9/1966  Siegmund ..................... 65/31
3,558,377  1/1971  Tantillo ........................ 65/31

Primary Examiner—Alfred L. Leavitt
Assistant Examiner—Kenneth P. Glynn
Attorney—John J. Pederson ABSTRACT: A method of activating a microchannel plate formed of a stack of very small internal diameter channels constructed of lead glass, by reacting the microchannel plate with a solution of a simple or complex metal hydride reducing agent dissolved in an inert solvent, and an apparatus for use with such method provided with a means for controlling the reaction.

PATENTED DEC 21 1971 3,628,933

Inventor
Walter E. Kramer
By John J. Pederson
Attorney

METHOD OF ACTIVATING LEAD GLASS MICROCHANNEL PLATES

BACKGROUND OF THE INVENTION

The present invention relates to a form of electron multiplier commonly referred to as a microchannel plate. The microchannel plate viewed endwise resembles a honeycomb structure and is formed of a stack of channels of very small internal diameter, as for example approximately 0.001 inch or less. The channels are constructed of lead glass. The lead of the glass is in lead silicate form and may account for as much as 50 percent or more of the weight of the glass. When the microchannel plate is treated in a reducing atmosphere some of the lead silicate of the channels is reduced to pure lead. The microchannel plate then becomes conductive from end to end and is also activated so that the internal wall surfaces of the channels are secondary emitters. An electron entering such a channel and bouncing between its walls produces secondary electrons which are accelerated through the channel by a suitable potential difference applied between its ends.

The method used to activate a microchannel plate in the prior art has been to treat the microchannel plate with a hydrogen gas atmosphere. The microchannel plate is heated to an elevated temperature of approximately 400° C. and is exposed to a continuous stream of hydrogen gas also heated to an elevated temperature of approximately 400° C. The hydrogen gas passes through the channels of the microchannel plate and reduces some of the lead silicates to pure lead, thus rendering the microchannel plate conductive from end to end and also activating it to make the internal surfaces secondary emissive.

This method used in the prior art while being capable of activating a microchannel plate has exhibited numerous difficulties. The hydrogen atmosphere reduction is inefficient, and difficult to control. The low efficiency of the hydrogen gas treatment for reducing a microchannel plate is attributed to the small amount of hydrogen gas which reacts with the lead glass when passing through the microchannel plate channels. As a result it is necessary to conduct the reduction reaction for long periods of time, typically ranging from 8 to 16 hours, and the reduction reaction consumes a large amount of hydrogen gas at the rate of approximately 1 liter per minute.

The temperature of the reducing medium and the microchannel plate is always critical in a microchannel plate reduction reaction. Although the temperature of the hydrogen gas and microchannel plate can be maintained within certain limits, this variable can never be completely stabilized. Also, because it is never known exactly how much of the hydrogen gas has reacted with the lead glass of the microchannel plate, it is never known when a given amount of the lead glass has been reduced. The inability to predict how much hydrogen gas has reacted with the lead glass of the microchannel plate and the inability to stabilize completely the temperature variable make it difficult to control the reaction. Therefore, microchannel plates with desired electron multiplication properties are difficult to produce, when treated with hydrogen gas.

Accordingly, it is an object of the present invention to provide a method of activating and making conductive from end to end a microchannel plate constructed of lead glass which avoids or minimizes the aforementioned difficulties of the prior hydrogen gas reduction process.

A more specific object of the invention is to provide a method of activating and making conductive from end to end a microchannel plate constructed of lead glass which is efficient and which is not as temperature sensitive as prior methods.

A further object of the invention is to provide a new and improved apparatus for activating microchannel plates, which is capable of controlling the extent of the reaction to provide optimum activation.

SUMMARY OF THE INVENTION

The invention provides a method of activating and making conductive from end to end a microchannel plate formed of a stack of very small internal diameter channels constructed of lead glass. A reducing solution of a simple or complex metal hydride reducing agent in an inert solvent is provided, and the microchannel plate is placed into the solution to react the simple or complex metal hydride reducing agent with the lead glass of the microchannel plate. After the microchannel plate reacts with the simple or complex metal hydride reducing agent, the residual reducing agent is removed from the microchannel plate, and the microchannel plate is thereafter dried.

The invention also provides an apparatus for use with a reducing solution which reacts to reduce the microchannel plate formed of a stack of very small internal diameter channels constructed of lead glass, thus rendering the microchannel plate activated and conductive from end to end and producing hydrogen gas as a byproduct of the reduction reaction. The apparatus comprises means including a watertight container for providing an essentially moisture-free environment for the reduction reaction, monitoring means associated with the container for developing a control effect in response to the variations in the amount of hydrogen gas byproduct evolved from the reduction reaction, and also means coupled to the monitoring means for controlling the reduction reaction in response to the control effect.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
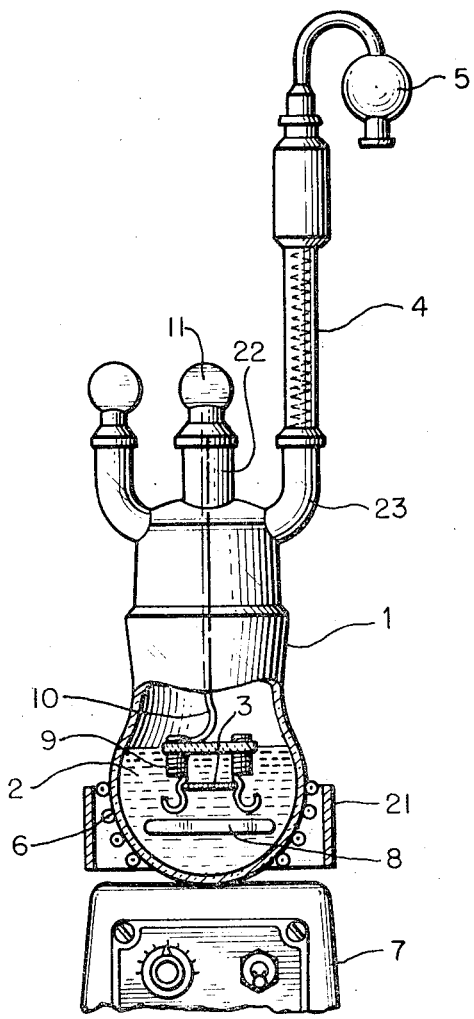
FIG. 1 is a side view, partly cut away, of an apparatus for use in activating microchannel plates in accordance with the method of the present invention.

A watertight container 1 which provides an essentially moisture-free environment for the reduction of a microchannel plate constructed of lead glass is shown in FIG. 1. The container 1 is partially filled with reducing solution 2 composed of a simple or complex metal hydride reducing agent such as lithium aluminum hydride or aluminum hydride dissolved in an inert solvent such as 1, 2 -dimethoxyethane, tetrahydrofuran, or diethyl ether. A preferred composition of the reducing solution 2 is a 1 percent solution of lithium aluminum hydride or aluminum hydride in 1, 2, -dimethoxyethane. The microchannel plate 3 is held in place by a holding clamp 9 and suspended in the reducing solution 2 by a wire 10 which is affixed to the center stopper 11. The center stopper 11 covers the center inlet tube 22. The watertight container 1 is equipped with a reflux condenser 4 which communicates with the right inlet tube 23. A moisture trap 5, which aids in providing a moisture-free environment for the reduction reaction, is placed over the reflux condenser 4. The heating elements 6 of an electric heating mantle 21 provide heat to hasten the reaction if desired; preferably, elements 6 are employed to maintain the reducing solution at its boiling temperature to provide substantial temperature stabilization of the reaction. The watertight container 1 sits on top of a magnetic stirrer 7 which provides a varying magnetic field to rotate an internal bar magnet 8 so that the reducing solution 2 is continuously circulated around the microchannel plate 3. The reflux condenser 4 captures any solvent vapor which is given off due to the boiling of the reducing solution 2, condenses the solvent vapor, and returns the solvent back to the reaction. The moisture trap 5 captures any moisture which inadvertently may enter into the reaction environment.

The lead glass microchannel plate reacts directly with the lithium aluminum hydride or aluminum hydride reducing agent, reducing the lead silicates of the microchannel plate to pure lead and resulting in a precipitation of lithium aluminum silicate or aluminum silicate and the evolution of hydrogen gas as a byproduct of the reduction reaction. The reduction reaction is allowed to run for 4 hours. Then, the microchannel plate 3 is removed from the reducing solution and treated with a 0.2 Normal solution of hydrochloric, nitric, or perchloric acid. This removes any residual hydride reducing agent from the microchannel plate. Alternatively, residual hydrides may be removed by pulling up the center stopper 11 and suspending the microchannel plate 3 above the boiling reducing solution so that the inert solvent from solution 2 condenses from the vapor phase onto the microchannel plate to dissolve the residual reducing agent. After the residual reducing agent is removed, the acid or condensate, depending upon which step is chosen to remove the residual reducing agent, is removed, as by taking it out of the chamber and washing it in distilled water, after which it is dried, preferably by normal evaporation drying in air at room temperature.

Microchannel plates activated by prior art processes have an end-to-end resistance normally ranging from 25 megohms to 200 megohms. Microchannel plates treated by the present inventive method had end-to-end resistances ranging from 69 megohms to 112 megohms. This narrow range is the result of the increased control of the reduction reaction obtainable with the present inventive method. Thus, the end-to-end resistance tolerance is improved by an order of magnitude, providing greatly enhanced uniformity in the performance characteristics of the finished product.

Figure 2:
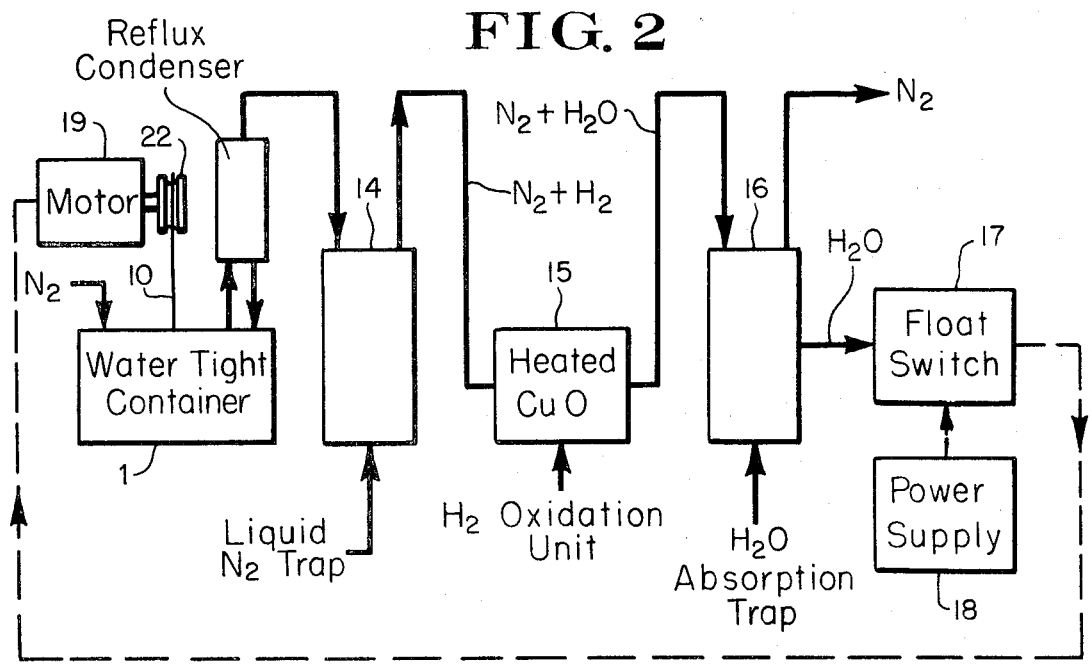
FIG. 2 is a block diagram of apparatus for automatically achieving optimum activation of a microchannel plate in accordance with another feature of the invention.

FIG. 2 is a block diagram of an apparatus for automatically controlling the reaction in accordance with another feature of the present invention. Nitrogen gas is introduced into the watertight container 1, which may be of the construction shown and described in connection with FIG. 1, and sweeps out the hydrogen gas byproduct of the reduction reaction. The nitrogen and hydrogen gases then pass through the reflux condenser tube 4 and enter a liquid nitrogen trap 14. This is to condense any solvent vapor which may have escaped from the watertight container 1 and trap the condensate. The nitrogen and hydrogen gases then pass through a hydrogen oxidation unit 15. The hydrogen oxidation unit 15 is provided with heated copper oxide which reacts with the hydrogen gas to form copper and water. The water and nitrogen gas then pass through a water absorption trap 16 where the water is absorbed and the nitrogen gas is allowed to escape, and the water passes into a float switch 17. When the water reaches a predetermined level, the float switch 17 contacts the power supply 18 to a motor 19 which drives a pulley 22 to turn and reel in the line 10 which extends through the center inlet tube of the watertight container and is affixed to the microchannel plate holder. This pulls the microchannel plate out of the reducing medium and terminates the reaction, after which the microchannel plate is treated to remove the residual simple or complex metal hydride reducing agent as previously described. Thus units 4, 14, 15, and 16 constitute monitoring means associated with container 1 for developing a control effect (namely the water level in float switch 17) which varies in response to variations in the amount of hydrogen gas byproduct evolved from the reduction reaction. Means comprising float switch 17 and motor 19 constitute means for controlling, e.g., terminating, the reduction reaction in response to the control effect developed by the monitoring means.

The invention makes it possible to treat a microchannel plate in only 4 hours, a fraction of the time previously required. The inventive method is efficient as evidenced by the fact that all of the reducing solutions used are only 1 percent solutions. Another advantage of the inventive method is that the temperature of the reaction can be stabilized if desired by maintaining the reducing solutions at their boiling temperature. This leaves time as the only variable to the reduction reaction and permits the attainment of much greater uniformity in performance specifications.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A method of activating and making conductive from end to end a microchannel plate formed of a stack of very small internal diameter channels constructed of lead glass, which method comprises:
   providing a reducing solution of a simple or complex metal hydride reducing agent dissolved in an inert solvent;
   placing said microchannel plate in said solution to react said simple or complex metal hydride reducing agent with said lead glass;
   removing from said microchannel plate residual simple or complex metal hydride reducing agent;
   and thereafter drying said microchannel plate.

2. A method in accordance with claim 1, where said inert solvent is a material selected from the group consisting of diethyl ether, tetrahydrofuran, and 1, 2, -dimethoxyethane and said reducing agent is aluminum hydride or lithium aluminum hydride.

3. A method in accordance with claim 1, where said reducing solution is a solution comprising lithium aluminum hydride reducing agent in 1, 2, -dimethoxyethane solvent.

4. A method in accordance with claim 1, where said reducing solution is a solution comprising aluminum hydride reducing agent in 1, 2, -dimethoxyethane solvent.

5. A method in accordance with claim 1, which includes the further step of maintaining said solution at its boiling temperature while said simple or complex metal hydride reducing agent reacts with said lead glass.

6. A method in accordance with claim 1, where said residual simple or complex metal hydride reducing agent is removed from said microchannel plate by condensing an inert solvent for said reducing agent from its vapor phase onto said microchannel plate to dissolve said residual reducing agent, and removing the condensate from said microchannel plate.

7. A method in accordance with claim 1, where said residual simple or complex metal hydride reducing agent is removed from said microchannel plate by chemically reacting it with an acid from the group consisting of hydrochloric acid, perchloric acid and nitric acid.

* * * * *